Feb. 6, 1968    T. D. H. ANDREWS ETAL    3,367,277

HYDRAULIC DISPLACEMENT DEVICES

Filed Nov. 15, 1965      3 Sheets-Sheet 1

INVENTOR
Thomas D. H. Andrews
Robert C. Eeles
BY
Orland M. Christensen
ATTORNEY

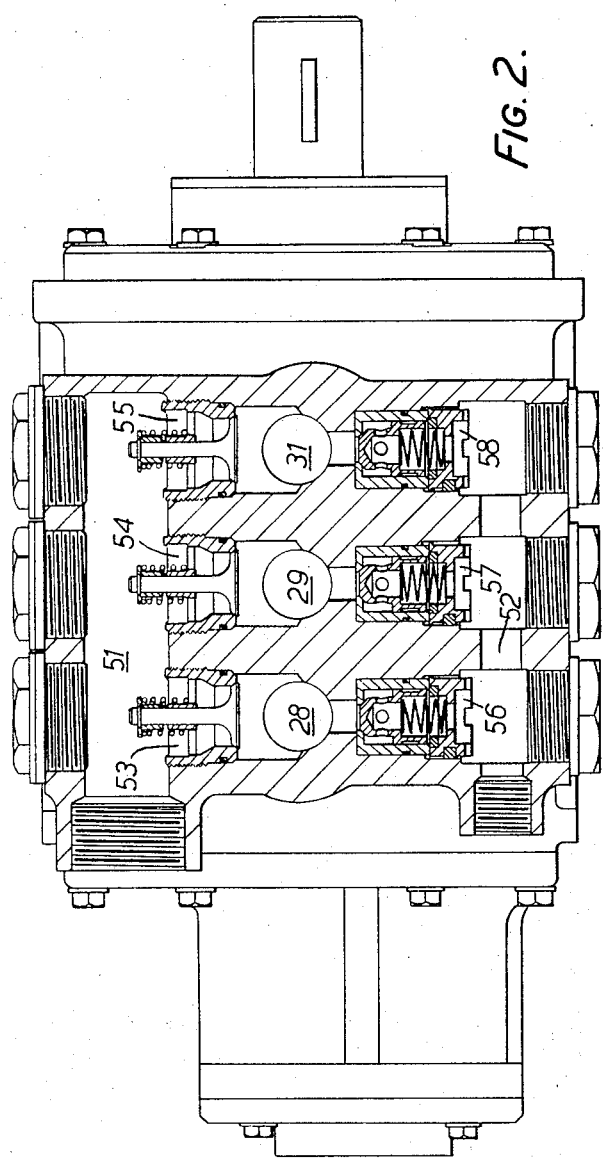

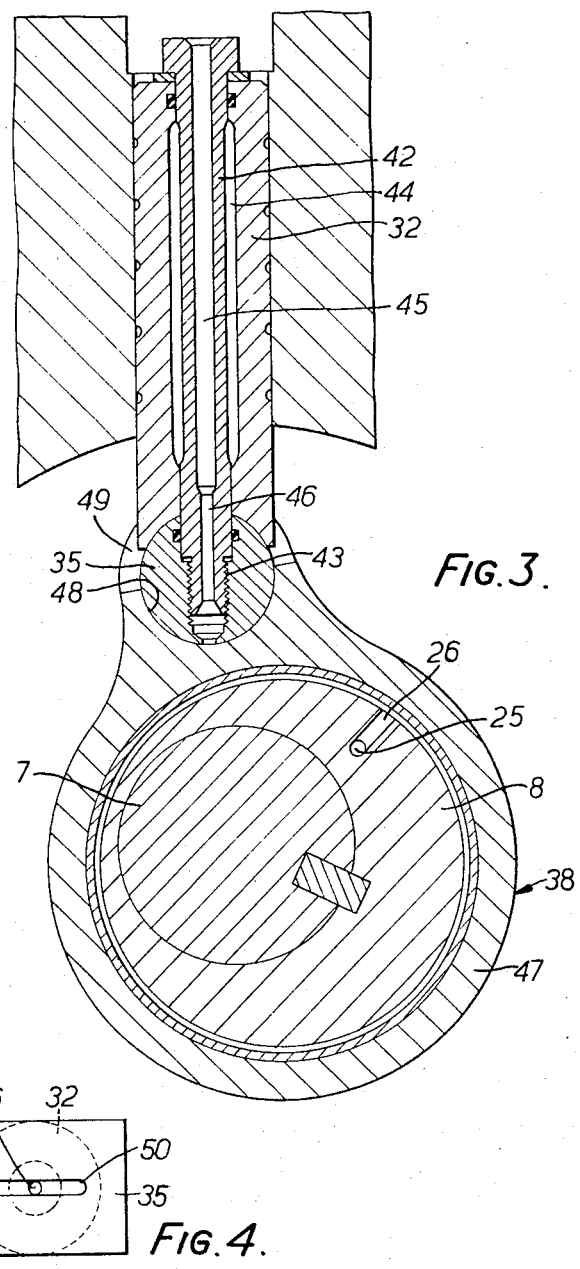

United States Patent Office 3,367,277
Patented Feb. 6, 1968

3,367,277
HYDRAULIC DISPLACEMENT DEVICES
Thomas D. H. Andrews and Robert C. Eeles, Cheltenham, England, assignors to Dowty Technical Development Limited
Filed Nov. 15, 1965, Ser. No. 507,850
Claims priority, application Great Britain, Nov. 23, 1964, 47,492/64
4 Claims. (Cl. 103—169)

ABSTRACT OF THE DISCLOSURE

A pump or motor for operation at high pressure with liquid of low lubricity. The pump or motor comprises one or more assemblies each having an eccentric bearing member, a connecting rod having a big end bearing member rotatably mounted on the eccentric bearing member, a cylinder bore, a piston reciprocable in the cylinder bore whose length is substantial compared with the amplitude of reciprocation, a large cylindrical gudgeon pin secured to the piston externally of the cylinder, and a hydraulic pressure feed through the piston from the cylinder to the gudgeon pin to provide a hydrostatic bearing between the connecting rod and the gudgeon pin which will maintain or tend to maintain the piston and gudgeon pin in a state of hydrostatic balance.

---

This invention relates to a hydraulic displacement device such as a pump or a motor for operation with liquid at high pressure and more particularly, although not exclusively for operation with liquids of low lubricity.

In accordance with the present invention a hydraulic displacement device such as a pump or a motor comprises a rotary shaft having an eccentric bearing member, a connecting rod having a big end bearing member rotatably mounted on the eccentric bearing member, a cylinder bore, a piston reciprocable in the cylinder bore whose length is substantial compared with the amplitude of reciprocation, a cylindrical gudgeon pin of substantial dimensions compared with a cylinder bore cross-section securing the connecting rod to the piston externally of the cylinder bore for all piston positions during reciprocation, valve means controlling flow of liquid into and out of the cylinder in synchronism with piston reciprocation, a recess in one of the co-operating gudgeon pins and cylindrical connecting rod surfaces, and a restricted flow passage extending through the piston from the cylinder bore to the recess so that liquid at pressure in the cylinder may communicate with the recess to generate a hydraulic force in the recess which opposes the hydraulic force exerted on the piston in the bore.

Preferably the piston is hollow and the gudgeon pin is attached to the piston by means of a screw-threaded bolt extending completely through the piston and being sealed thereto at either end of the piston to isolate the hollow space, thereby reducing the mass of the piston without increasing the unswept volume within the cylinder bore. The bolt may be formed with an axial passage part of which is of reduced diameter to form the restricted flow passage.

The cylindrical connecting rod surface may be formed within lugs forming part of the connecting rod and which extend partly around the gudgeon pin leaving a gap or gaps adjacent to the position at which the piston extends from the gudgeon pin. Preferably a pair of lugs are located to engage one end portion of the gudgeon pin and another pair of lugs are located to engage the other end portion of the gudgeon pin.

A hydraulic displacement device in accordance with the invention may comprise a plurality of assemblies each comprising a cylinder, a piston, a gudgeon pin, a connecting rod and an eccentric as set out in any preceding paragraph, and a single rotary shaft carrying the eccentrics in end to end relation, the cylinder bores being formed in a single block so that the bores face respectively onto their co-operating eccentrics.

How the invention can be carried into effect is hereinafter particularly described with reference to the accompanying drawings in which:

FIGURE 2 is a cross-section through the embodiment of FIGURE 1 showing the valve means, FIGURE 3 is a detailed cross-section showing the association of the crank shaft, a connecting rod, a gudgeon pin, and a piston, and FIGURE 4 shows an end view of a gudgeon and piston.

Figure 1:
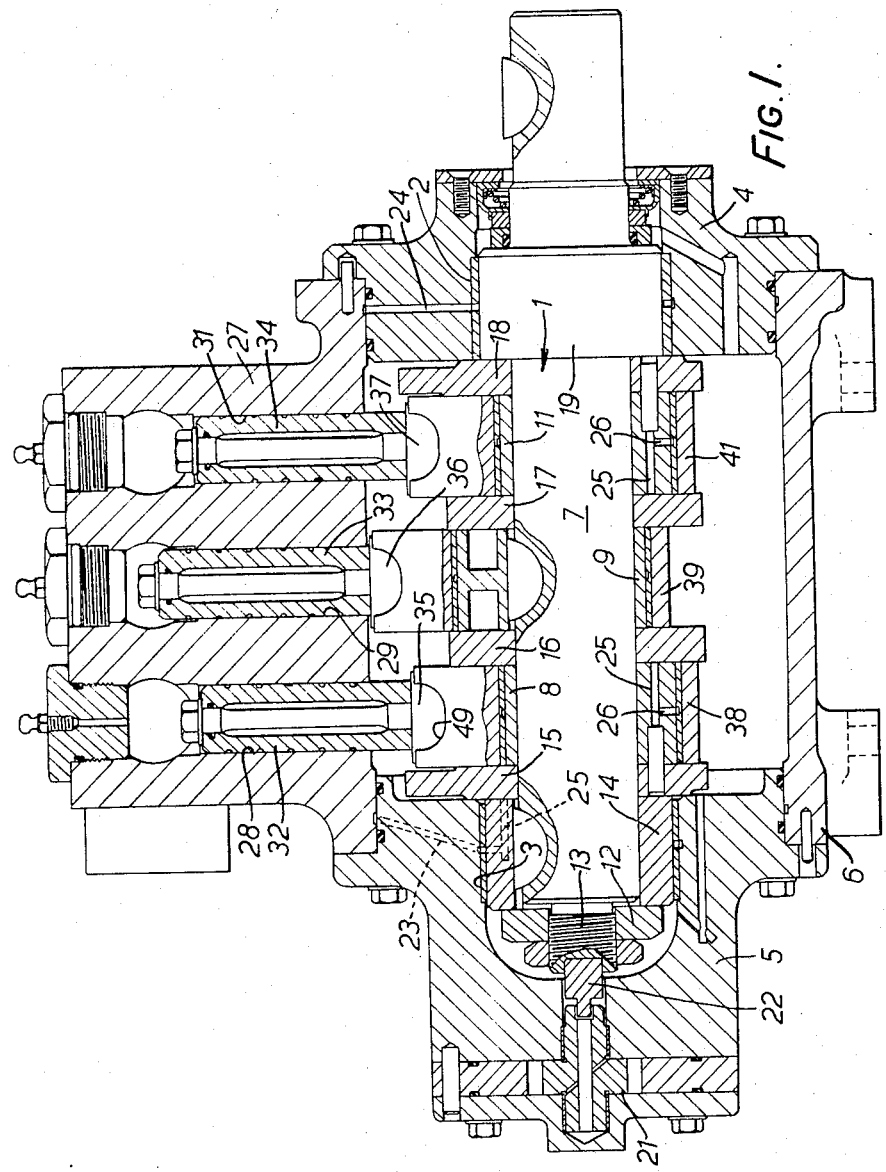
FIGURE 1 is a longitudinal cross-section through the embodiment.

The embodiment of the invention shown in the drawings is intended as a pump to supply liquid of low lubricity such as oil in water emulsions under high pressure. The main shaft 1 of the pump is mounted at either end by plain bearings 2 and 3 carried by the end walls 4 and 5 of a crank case 6. The crank case comprises a central elongated cylindrical shaft 7 on which three eccentric bearing members 8, 9 and 11 are secured by keys and by means of an endwise clamping nut 12 located on the screw-threaded extension 13 of the shaft 7. The endwise clamping force is transmitted through a cylindrical sleeve 14 and through spacing members 15, 16, 17 and 18 to an enlarged flange portion 19 of the shaft. The sleeve forms one bearing of the shaft for co-operation with the bearing 3 and the flange 19 forms another bearing for co-operation with the bearing 2.

Within the end wall 5 a gear pump 21 is provided which is driven by an extension 22 from the shaft 7. Liquid delivered by the gear pump 21 is fed to passages 23 and 24 to enter the main bearings 2 and 3. Passages 25 within the sleeve 14, the eccentrics, the enlarged flange portion 19 and the spacing members carry this liquid to ports 26 opening into the cylindrical bearing surfaces of the three eccentrics. The gear pump draws liquid from a main reservoir. The liquid delivered by the pump to the ports 26 escapes over the bearing surfaces of the three eccentrics to enter the crank case. Liquid delivered by the pump also escapes from the main bearing surfaces to enter the crank case. A connection extends from the crank case back to the reservoir and the liquid thus circulated through the crank case by operation of the gear pump will provide a cooling effect in addition to lubrication. Normally the crank case will operate substantially full of liquid.

A cylinder block 27 formed integrally with the crank case 6 includes three parallel cylinder bores 28, 29 and 31 formed therein. Within these bores are located respectively the pistons 32, 33 and 34. These pistons extend into the crank case 6 and within the crank case each piston has a gudgeon pin secured thereto, indicated respectively as 35, 36 and 37. For each eccentric there is provided a connecting rod respectively shown at 38, 39 and 41. The construction of the connecting rod, gudgeon pin and piston assemblies are all similar to one another and FIGURE 3 shows in cross-section the assembly 32, 35, 38. The piston is quite long compared with its reciprocating stroke and in the embodiment shown the piston is four times as long as its stroke. The lower end of the piston as seen in FIGURE 3 is formed with a concave cylindrical surface whose axis extends transversely to the piston axis. This cylindrical surface has the same curvature as that of the cylindrical surface of gudgeon pin 35. The diameter of the gudgeon pin 35 is the same as the diameter of piston 32 but the length of the gudgeon pin is somewhat longer than the diameter of the piston 32. The piston is secured to extend centrally from the length of the gudgeon pin. The piston is secured to the gudgeon pin by means of a long bolt 42 which extends completely through the length of the piston 32 and terminates in a screw-threaded portion 43 engaging in a corresponding screw-threaded hole in the gudgeon pin. The piston is bored out to form a cavity 44 which is sealed at either end by seals engaging the bolt 42. The function of the cavity is to lighten the piston without increasing the unswept volume of the cylinder.

A passage 45 is formed through the centre of the bolt 42 which terminates within the gudgeon pin in a small diameter hole 46 which forms a restrictor. The passage 45 and restrictor 46 together form a restricted flow passage. The hole through the gudgeon pin opens on the opposite side thereof so that liquid having passed through the passage 45 and the restrictor 46 has access to the opposite surface of the gudgeon pin. The connecting rod 38 comprises a circular strap member 47 embracing the eccentric and fitting it closely, a layer of anti-friction metal being interposed between the strap and the eccentric. The gudgeon pin engages in a transverse cylindrical bore 48 formed in the connecting rod and extending parallel to the rotation axis of the eccentric. The end of the connecting rod adjacent to the piston is formed with two pairs of lugs 49 which are spaced to accommodate the piston and to allow for angular reciprocation of the connecting rod relatively to the piston about the gudgeon pin. The lugs of each pair do not extend completely around the gudgeon pin but terminate as shown in FIGURE 1, leaving the portion of the gudgeon pin adjacent to the piston completely exposed. This enables the gudgeon pin to approach very closely to the lower surface of the cylinder block at the top dead centre position of the piston so that the length of piston projecting from the cylinder bore is never greater than the stroke of the piston. This feature is desirable in order to reduce the bending moments exerted on the piston by the connecting rod during reciprocation. In order further to reduce the effective length of the piston projecting from the cylinder, recesses may be cut into the cylinder block into which the exposed surface of the gudgeon pin may enter at the top dead centre position of the piston.

A recess 50 is formed along the parts of the gudgeon pin surface opposite to the piston, this recess being arranged to terminate substantially short of the ends of the gudgeon pin. This recess connects with the restrictor 46 so that liquid at pressure within the cylinder bore may pass through the piston and react in the recess 50. Whilst the recess 50 is considerably smaller in cross-section than the area of the piston the liquid fed to the recess 50 will escape between the surfaces of the gudgeon pin and of the cylindrical bore 48 forming a cylindrical film of liquid at substantial pressure. Whilst the pressure of liquid in this film will vary with distance from the groove 50 the total effective area of the film which can produce force to oppose the force exerted on the piston in the cylinder will be larger than the cross-sectional area of the piston. The function of the restrictor 46 is to control pressure in the recess 50 inversely in accordance with the clearance between the cylindrical surface of the gudgeon pin and the surface 48. If this clearance is large permitting substantial escape of liquid the large leakage flow flowing through the restrictor 46 will lose pressure substantially and the pressure in the recess will be low allowing the cylindrical surfaces in the neighbourhood of the groove 50 to move more closely together. As the surfaces move closely together leakage flow is reduced and the pressure drop occuring in the restrictor 46 is reduced whereby a higher pressure acts in the recess 50. The thickness of the film between the two cylindrical surfaces will thereby adjust itself until the axial force exerted by pressure of liquid in the recess 50 and in the film between the two cylindrical surfaces will balance substantially the force exerted on the piston by liquid at pressure within the cylinder bore.

In the end of the cylinder block remote from the crank shaft an inlet passage 51 and a delivery passage 52 are formed. From the passage 51 three non-return valves 53, 54 and 55 open respectively into the cylinders 28, 29 and 31. Three delivery non-return valves 56, 57 and 58 open respectively from the cylinders into the delivery passage 52.

In operation of the pump described the shaft 7 is driven by a suitable motor or engine to rotate the eccentrics and to cause reciprocation of the three pistons. The eccentrics are preferably so placed that their eccentricities about the axis of shaft 1 are spaced from one another by 120 degrees. Each piston in moving from the top dead centre to the bottom dead centre will induce liquid into the cylinder through the inlet non-return valve and on moving from bottom dead centre to top dead centre will compress liquid in the cylinder to cause it to pass through the delivery non-return valve. The inlet passage 51 draws its liquid from a reservoir which also supplies the inlet to the gear-pump 21. Due to angular spacing of the eccentrics about the shaft 7 there will be a substantially continuous delivery of liquid into the delivery passage 52. In urging each piston from bottom dead centre to top dead centre to compress the liquid it will be seen that some liquid will pass centrally through the piston to the recess 50 in the gudgeon pin surface, a film of leakage liquid between the gudgeon pin surface and the cylindrical surface of the connecting rod being formed which substantially or almost substantially balances the end thrust on the piston due to pressure in the cylinder bore. During movement of the pistons from top dead centre to bottom dead centre the connecting rod acting through the lugs 49 will exert a pulling force on the gudgeon pin to pull the piston from its cylinder and so to create suction within the cylinder which will induce liquid into the cylinder through the inlet non-return valve. As will be seen from FIGURE 3 the rotation axis of the shaft 7 is off-set from the common plane containing the three axes of the cylinder bores 28, 29 and 31. This slight off-set enables a more direct thrust to be exerted by each eccentric through its connecting rod onto its piston during movement of the piston from bottom to top dead centre. This feature will require that the pump shaft 7 should be driven only in the direction in which the off-set of the shaft axis gives a more direct thrust on the piston during movement from the bottom to top dead centre.

The two outer spacing members 15 and 18 are eccentrically mounted on the shaft 7 so that their centres of gravity do not lie on the axis of the shaft 7. The spacing members are arranged to form counter-balance weights which are so positioned as to reduce the dynamic unbalance of the three eccentrics, connecting rods, gudgeon pins and pistons.

Whilst in the described embodiment each recess 50 has been provided in a gudgeon pin cylindrical surface it will be appreciated that it is within the scope of this invention for such recess to be provided in the cylindrical bore 48 of a connecting rod. Such a recess would preferably include one portion extending angularly around the gudgeon pin to the extent that it is always in connection with the restricted flow passage during angular movement of the connecting rod on the gudgeon pin. Alternatively recesses may be provided in both the gudgeon pin surfaces and the connecting rod cylindrical bores to receive liquid from the restricted flow passages.

We claim as our invention:
1. A hydraulic displacement device such as a pump or a motor comprising a rotary shaft having an eccentric bearing member, a connecting rod, a big end bearing member attached to the connecting rod and rotatably mounted on the eccentric bearing member, a cylinder bore, a piston reciprocable in the cylinder bore whose length is substantial compared with the amplitude of reciprocation, a cylindrical gudgeon pin of substantial dimensions compared with cylinder bore cross-section, securing the connecting rod to the piston externally of the cylinder bore, valve means controlling flow of liquid into and out of the cylinder in synchronism with piston reciprocation, a recess in one of the cooperating gudgeon pin and cylindrical connecting rod surfaces, and a restricted flow passage extending through the piston from the cylinder bore to the recess so that liquid at pressure in the cylinder bore may communicate with the recess to generate a hydraulic force in the recess which opposes the hydraulic force exerted on the piston in the bore, said piston being hollow and having a screw-threaded bolt extending completely therethrough into the gudgeon pin, to secure the piston to the gudgeon pin and seal the hollow space at either end of the piston, thereby reducing the mass of the piston without increasing the unswept volume within the cylinder bore.

2. A hydraulic displacement device including a plurality of assemblies each comprising a piston, a gudgeon pin fixed to the piston, a connecting rod having a cylindrical surface engaging the gudgeon pin, a big end bearing formed on the connecting rod, and an eccentric bearing member on which the big end bearing member is rotatably mounted; a single rotary shaft on which the eccentric bearing members are mounted in end to end relation, a cylinder block located by the shaft and having a plurality of cylinder bores in parallel, side by side relationship in the block, one to contain each piston for reciprocatory movement, there being a restricted flow passage extending through each piston to a recess in the associated gudgeon pin surface, such that hydraulic pressure in the cylinder is fed to the recess to produce a force on the piston opposing the hydraulic force exerted on the piston in the bore; and rotary balancing means operative to reduce dynamic unbalance of the foregoing assemblies.

3. A hydraulic displacement device as claimed in claim 1 wherein the bolt is formed with an axial passage part of which is of a reduced diameter, the whole passage forming the restricted flow passage.

4. The hydraulic displacement device according to claim 2 wherein the rotary balancing means includes a plurality of spacing members mounted on the shaft to locate the eccentric bearing members in their operative positions, at least one of which spacer members is secured with its center of gravity offset from the shaft axis.

References Cited
UNITED STATES PATENTS

| | | | |
|---|---|---|---|
| 2,155,455 | 4/1939 | Thoma | 103—162 |
| 2,880,042 | 3/1959 | Budzich | 103—162 |
| 3,015,529 | 1/1962 | Hardcastle | 92—257 |
| 3,018,737 | 1/1962 | Cook et al. | 103—173 |
| 3,165,072 | 1/1965 | Schultz | 103—153 |
| 3,227,094 | 1/1966 | Cailloux | 103—169 |

FOREIGN PATENTS

| | | |
|---|---|---|
| 1,001,861 | 10/1951 | France. |
| 1,081,908 | 12/1954 | France. |
| 392,992 | 6/1933 | Great Britain. |
| 783,336 | 9/1957 | Great Britain. |

DONLEY J. STOCKING, *Primary Examiner.*

WILLIAM L. FREEH, *Examiner.*